(12) United States Patent
Hsu

(10) Patent No.: US 6,583,530 B2
(45) Date of Patent: Jun. 24, 2003

(54) COMPOSITE STATOR STRUCTURE HAVING CORRESPONDING CONCAVE EMBEDDING RECEIVING GROOVES AND ARC-SHAPED TEETH SURFACES

(76) Inventor: Chun-Pu Hsu, No. 19, Wu Chuang Liu Rd., Wu Ku Industrial Park, Taipei Hsien (TW)

( * ) Notice: Subject to any disclaimer, the term of this patent is extended or adjusted under 35 U.S.C. 154(b) by 3 days.

(21) Appl. No.: 09/785,298

(22) Filed: Feb. 20, 2001

(65) Prior Publication Data

US 2002/0113518 A1 Aug. 22, 2002

(51) Int. Cl.[7] .............. H02K 1/12; H02K 1/18; H02K 1/28; H02K 15/00
(52) U.S. Cl. .................. 310/254; 310/218; 310/42
(58) Field of Search .................. 310/254, 218, 310/42

(56) References Cited

U.S. PATENT DOCUMENTS

| | | | | |
|---|---|---|---|---|
| 1,756,672 A | * | 4/1930 | Barr | 310/259 |
| 2,607,816 A | * | 8/1952 | Ryder et al. | 310/42 |
| 4,614,022 A | * | 9/1986 | Bibby et al. | 29/596 |
| 4,712,035 A | * | 12/1987 | Forbes et al. | 310/269 |
| 4,992,686 A | * | 2/1991 | Heine et al. | 310/42 |
| 5,256,926 A | * | 10/1993 | Hagenlocher et al. | 310/259 |
| 5,583,387 A | * | 12/1996 | Takeuchi et al. | 310/217 |
| 5,729,072 A | * | 3/1998 | Hirano et al. | 310/258 |
| 5,786,651 A | * | 7/1998 | Suzuki | 310/259 |
| 5,990,588 A | * | 11/1999 | Kliman et al. | 310/86 |
| 6,049,153 A | * | 4/2000 | Nishiyama et al. | 310/156.53 |
| 6,081,059 A | * | 6/2000 | Hsu | 310/179 |
| 6,164,657 A | * | 12/2000 | Merkin et al. | 277/412 |
| 6,181,040 B1 | * | 1/2001 | Schob | 310/103 |
| 6,229,238 B1 | * | 5/2001 | Graef | 310/164 |
| 6,400,059 B1 | * | 6/2002 | Hsu | 310/254 |
| 6,404,095 B1 | * | 6/2002 | Hsu | 310/254 |
| 6,448,685 B1 | * | 9/2002 | Mayer et al. | 310/254 |
| 6,448,686 B1 | * | 9/2002 | Dawson et al. | 310/254 |
| 6,472,783 B1 | * | 10/2002 | Witthohn et al. | 310/68 R |
| 6,472,792 B1 | * | 10/2002 | Jack et al. | 310/254 |
| 6,504,284 B1 | * | 1/2003 | Kazama et al. | 310/259 |

* cited by examiner

Primary Examiner—Nestor Ramirez
Assistant Examiner—Pedro J. Cuevas
(74) Attorney, Agent, or Firm—Rosenberg, Klein & Lee

(57) ABSTRACT

A composite stator structure is used for the motor or generator to provide high efficiency, low cogging torque and low cost. The stator structure is composed of silicon steel plates formed by pressing and stacking. The stator structure is composed of separated stator teeth, stator rings, winding and winding groove. The tooth has tooth tail engaged into the embedding groove of the stator ring to assemble a stator for motor or generator with high efficiency, low cogging torque and low cost.

4 Claims, 12 Drawing Sheets

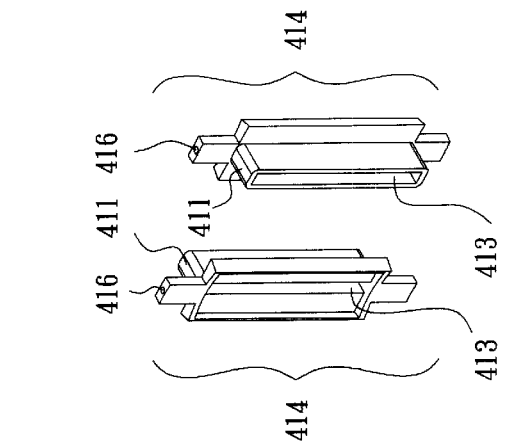
FIG. 2
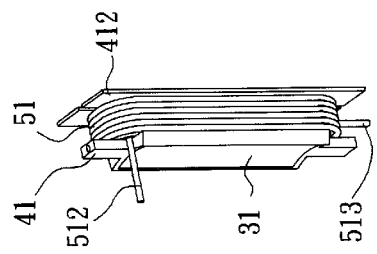
FIG. 2C
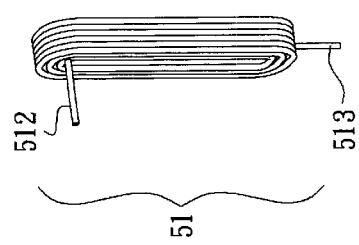
FIG. 2A
FIG. 2B
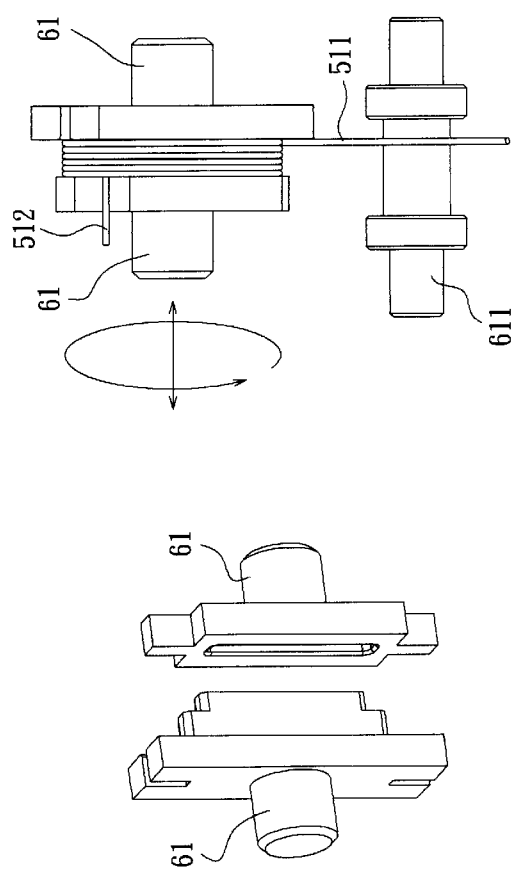
FIG. 2D
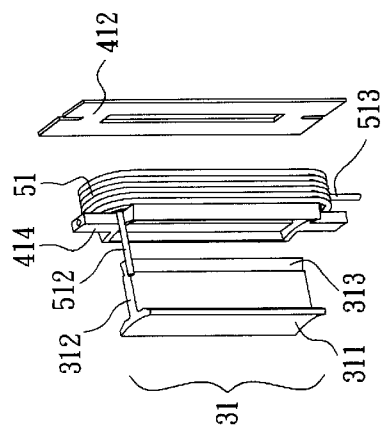
FIG. 2E
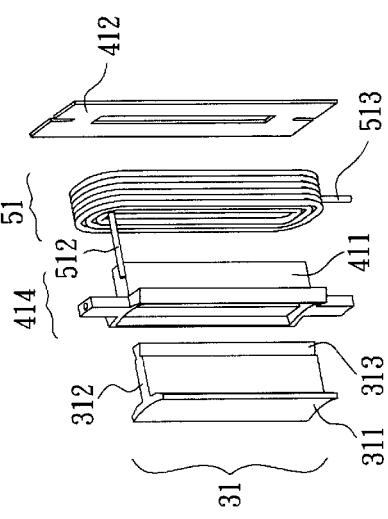
FIG. 2F

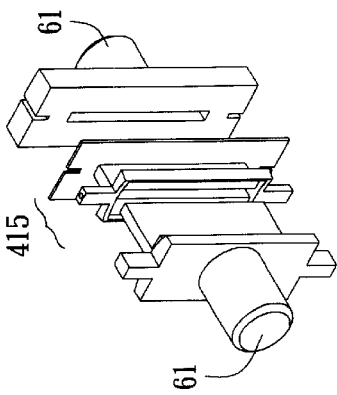
FIG. 3B
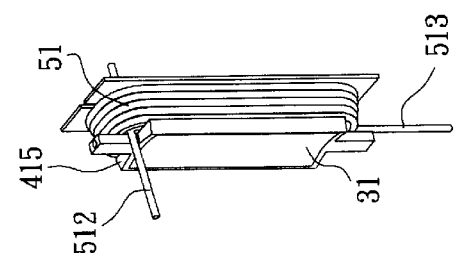
FIG. 3E
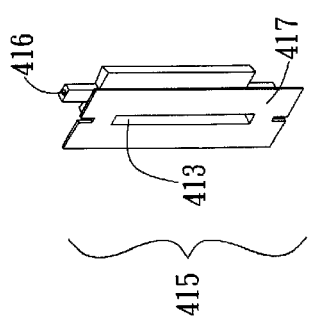
FIG. 3A
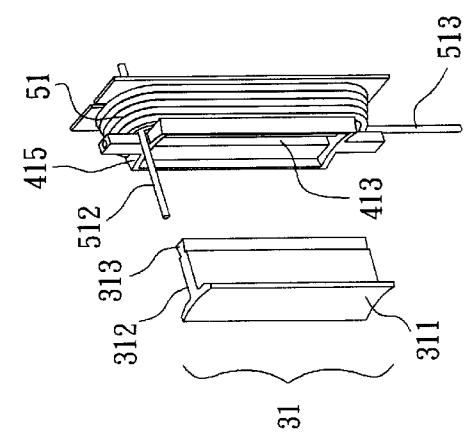
FIG. 3D
FIG. 3
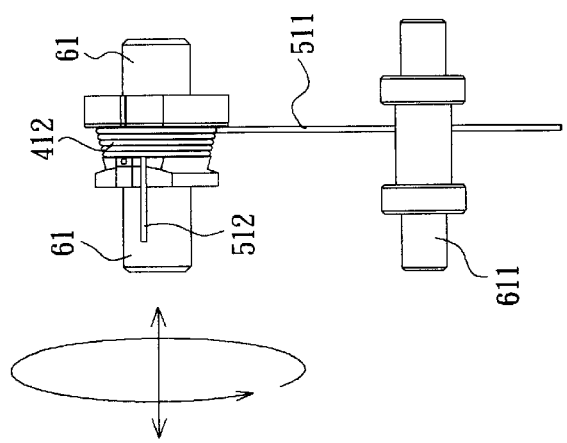
FIG. 3C e ≥ g   f < g h < i e ≥ g   f < g h < i FIG. 6
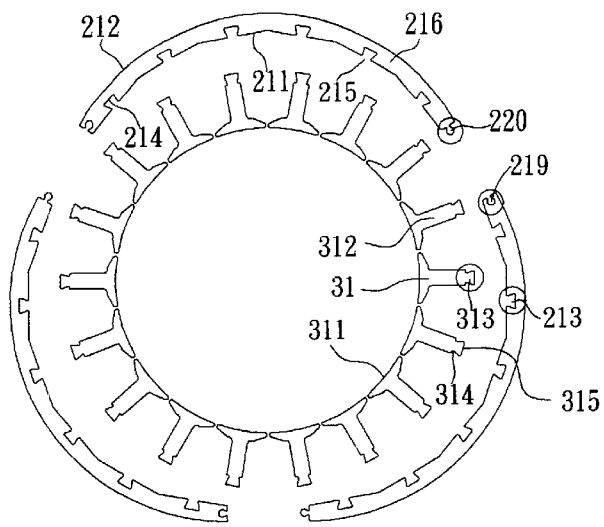
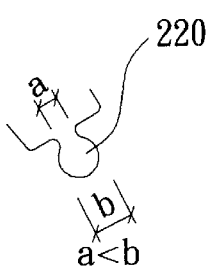
a<b
FIG. 6A
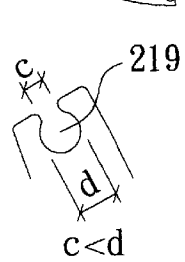
c<d
FIG. 6B
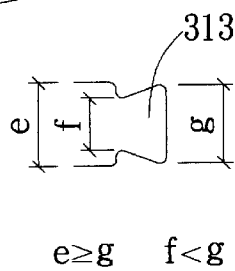
e≥g  f<g
FIG. 6C
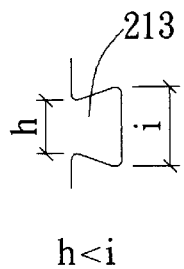
h<i
FIG. 6D
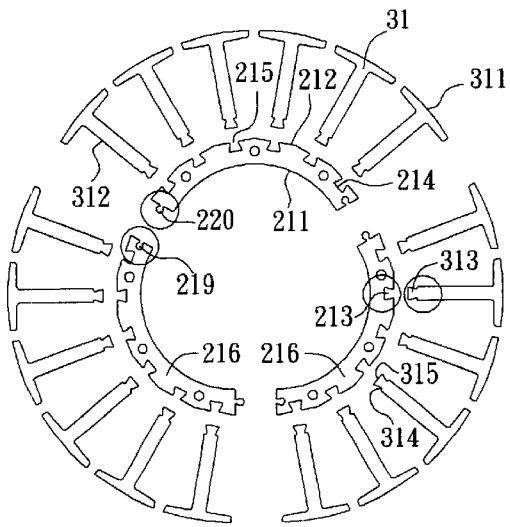
FIG. 6E
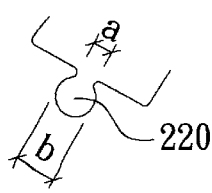
a<b
FIG. 6F
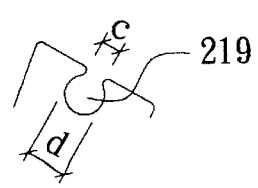
c<d
FIG. 6G
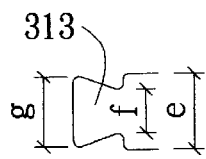
f<g  e≥g
FIG. 6H
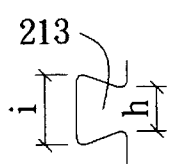
h<i
FIG. 6I a≤b c≤d e≥g  f<g h<i a≥b c≥d e≥g  f<g h<i

COMPOSITE STATOR STRUCTURE HAVING CORRESPONDING CONCAVE EMBEDDING RECEIVING GROOVES AND ARC-SHAPED TEETH SURFACES

FIELD OF THE INVENTION

The present invention relates to a stator structure, especially to a composite stator structure, wherein the winding and winding groove are separate to the stator such that the motor or generator using the stator has high efficiency, low cogging torque and low cost.

BACKGROUND OF THE INVENTION

The stator winding is crucial for stator to provide high operation efficiency. The stator winding should have high electrical loading and magnetic loading to achieve high operation efficiency. To achieve high electrical loading, the stator winding should have large radius and turn number to provide high electrical loading, i.e., a large electrical current flowing in the winding. Moreover, a winding with large coil radius can reduce electrical resistance and the power dissipation according to the formula, $W=I^2R$, wherein W is dissipated power, I is motor current, and R is coil copper resistance. Therefore, the occupying ratio of the stator winding in the winding groove should be high to allow thick coil used in the winding groove. As shown in FIGS. 12 and 12A, the best way to enhance the occupying ratio of the stator winding in the winding groove is to use winding in straight row. As shown in these Figures, the conventional inner and outer stator structure 71 comprises a plurality of stator teeth 31 with arc-shaped tooth surface 311 and tooth flank 312. The stator windings 51 are wrapped in the winding groove. The size of the opening 711 of the winding groove should be at least twice of the winding diameter such that the guiding needle of the CNC controlled winding apparatus can access the opening 711 of the winding groove to perform wrapping for the winding in straight row. Therefore, the occupying ratio of the stator winding in the winding groove is about 50% the winding in straight row. To improve the occupying ratio of the stator winding, one solution is to cut outwardly the winding groove at the center position. The cut portion has bendable connection means and the stator can be arranged in straight line to expand the opening of the winding groove. However, in above-mentioned stator, the tooth surface is wider than the tooth flank, the insulating winding groove and winding cannot be arranged on the tooth flank after the winding is achieved. The tooth flank of the stator in straight arrangement is insulated and then CNC controlled winding apparatus performs winding operation by three guiding needles. The occupying ratio of the stator winding in the winding groove is about 80% for this kind of winding. However, in above-mentioned two kinds of windings, they both need CNC controlled winding apparatus; and the winding coil passes through the needle hole of the guiding needle and wrapped by the CNC controlled winding apparatus. The above-mentioned two kinds of windings have following problems:

1. The winding apparatus is CNC controlled, the precision of winding tool is demanding and the cost is high.
2. The precise CNC controlled winding apparatus is hard to control, the cost for training and maintaining is high.
3. The torque of the CNC controlled winding apparatus is influenced by the thickness of the winding coil. A large torque will affect the structure of the hole of the guiding needle. Therefore, the precise CNC controlled winding apparatus is not suitable for winding with thick coil.
4. The winding speed is low for the CNC controlled winding apparatus (60–800 rpm), the manufacturing efficiency is low.
5. The precise CNC controlled winding apparatus has high cost (6–10 million Japanese Yan), the cost of motor thus manufactured is high.

SUMMARY OF THE INVENTION

The conventional stator has high occupying ratio of the stator winding in the winding groove and thus high efficiency. However, the conventional stator is in straight-row arrangement and requires high-cost CNC controlled winding apparatus. The present invention employs high-density silicon steel plates processed by a simple and high efficient winding machine (such as rotation winding machine) and a pressing and bending machine (such as a spring-forming apparatus) to provide a composite stator structure, whereby the motor or generator using the stator has high efficiency, low cogging torque and low cost.

In one aspect of the invention, the stator has a plurality of tooth flanks, which can be detached from the stator teeth, the largest width of the outer end of the tooth tail cannot exceed the width of the tooth flank such that the tooth tail can be embedded into the stator ring. The winding groove can be made in advance and can use simple wiring apparatus. The high-cost CNC controlled winding apparatus is saved. Moreover, the winding can be achieved in multiple axes fashion to enhance efficiency.

In another aspect of the invention, the winding can be separated formed and then assembled with the winding groove and the stator tooth. The problem of winding torque due to thick coil can be solved. When the motor or generator is used in high-pressure and low-current situation, the winding can use thinner coil. The winding can be directly wrapped on the winding groove with no distortion. The tooth tail is embedded into the embedding groove on the stator ring, thus formed a stator with high efficiency, low cogging torque and low cost.

In still another aspect of the invention, the stator teeth are separated; the tooth surface has smaller separation with adjacent tooth surface. The mouth of the winding groove is also reduced. The cogging torque of rotor is also reduced.

The various objects and advantages of the present invention will be more readily understood from the following detailed description when read in conjunction with the appended drawing, in which:

BRIEF DESCRIPTION OF DRAWING

FIGS. 2 and 2A–2F show the views of the windings of the present invention;

FIGS. 3 and 3A–3E show the views of the winding grooves of the present invention;

FIGS. 6 and 6A–6I show the views of the inner and outer stators and teeth of the second preferred embodiment of the present invention;

DETAILED DESCRIPTION OF THE INVENTION

Figures 1, 1A:
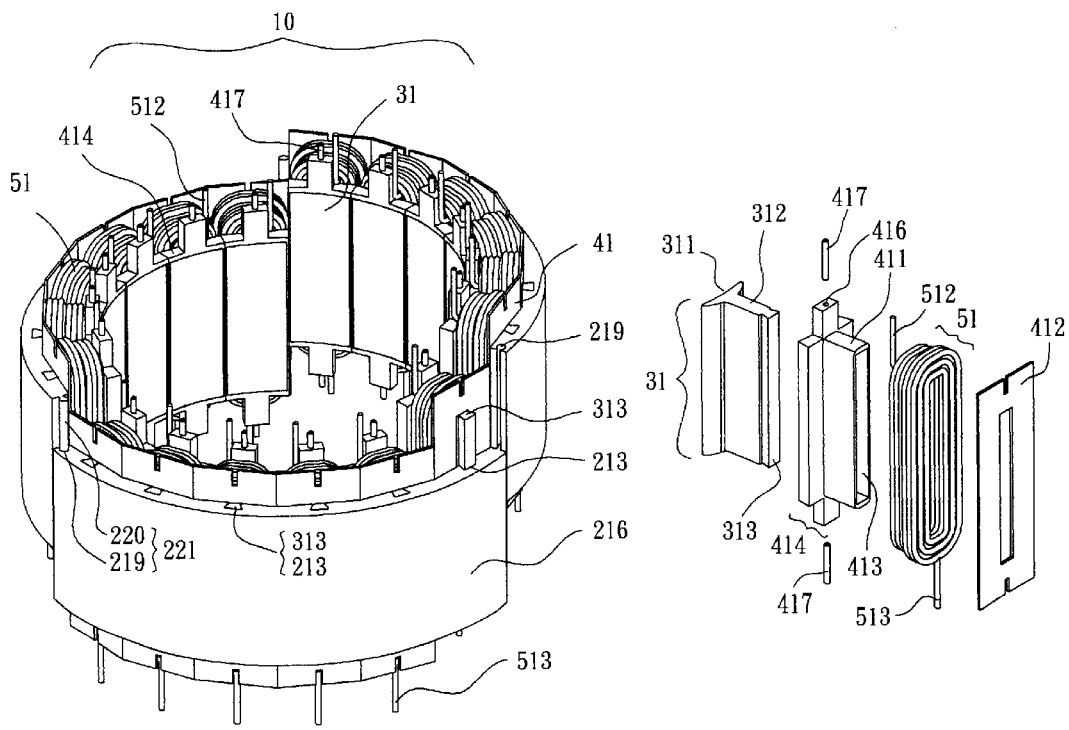
FIGS. 1 and 1A–1C show the views of the inner and outer stators of the second preferred embodiment of the present invention.
Figures 1B, 1C:
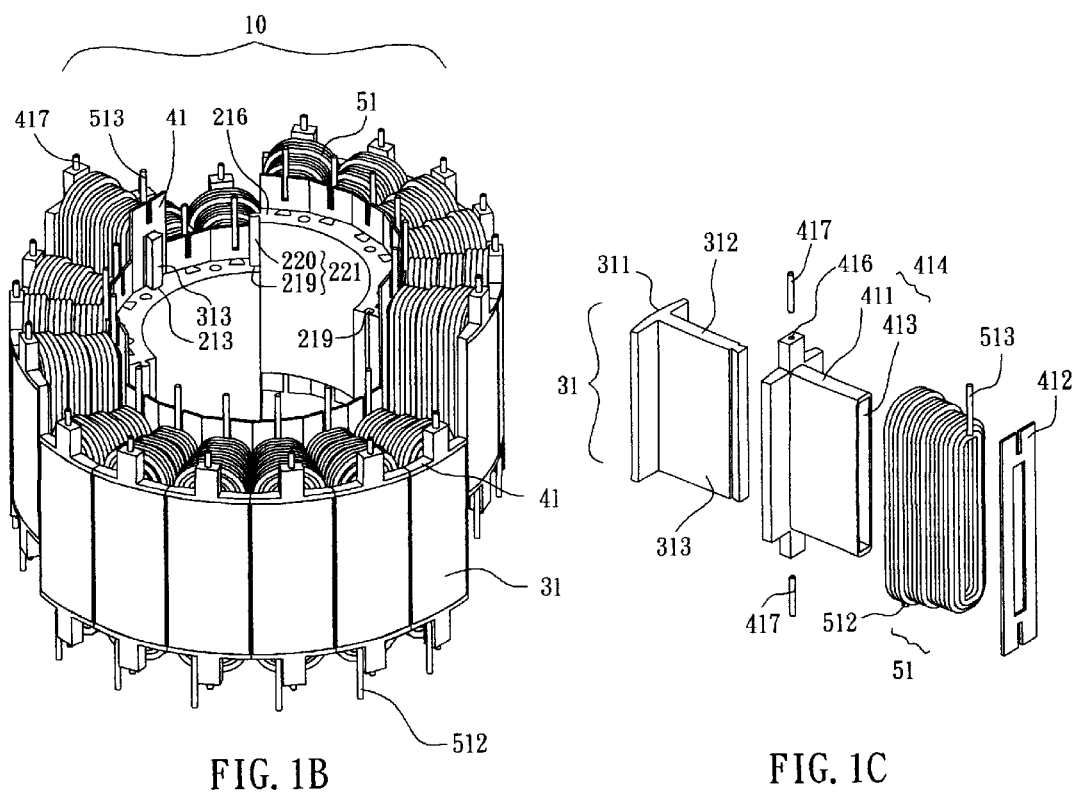
Figure 4:
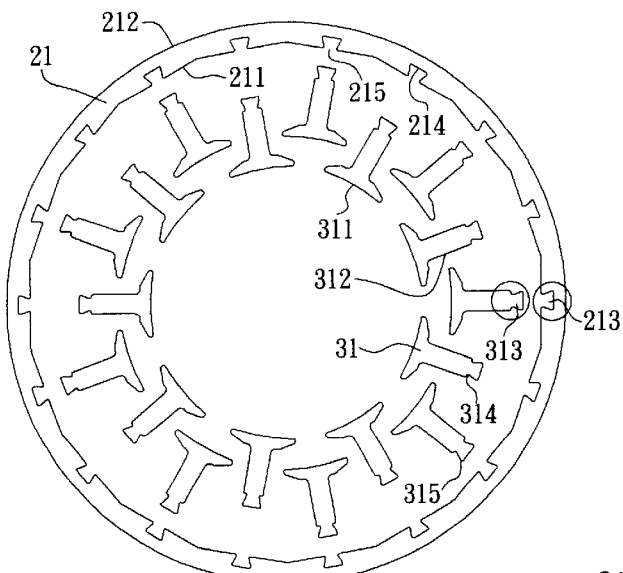
FIGS. 4 and 4A–4E show the views of the inner and outer stators and teeth of the first preferred embodiment of the present invention.
Figure 4A:
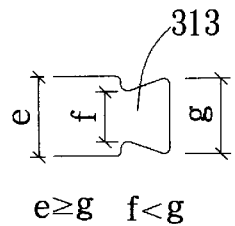
Figure 4B:
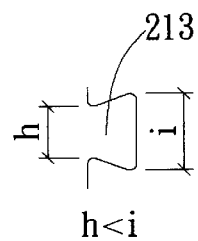
Figure 4C:
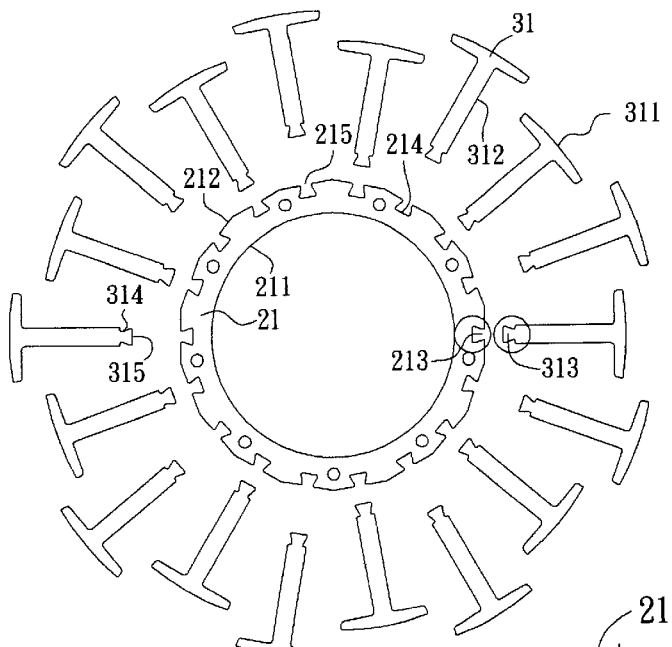
Figure 4D:
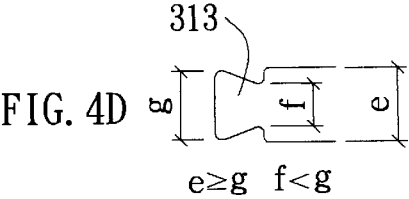
Figure 4E:
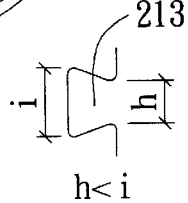
Figure 5:
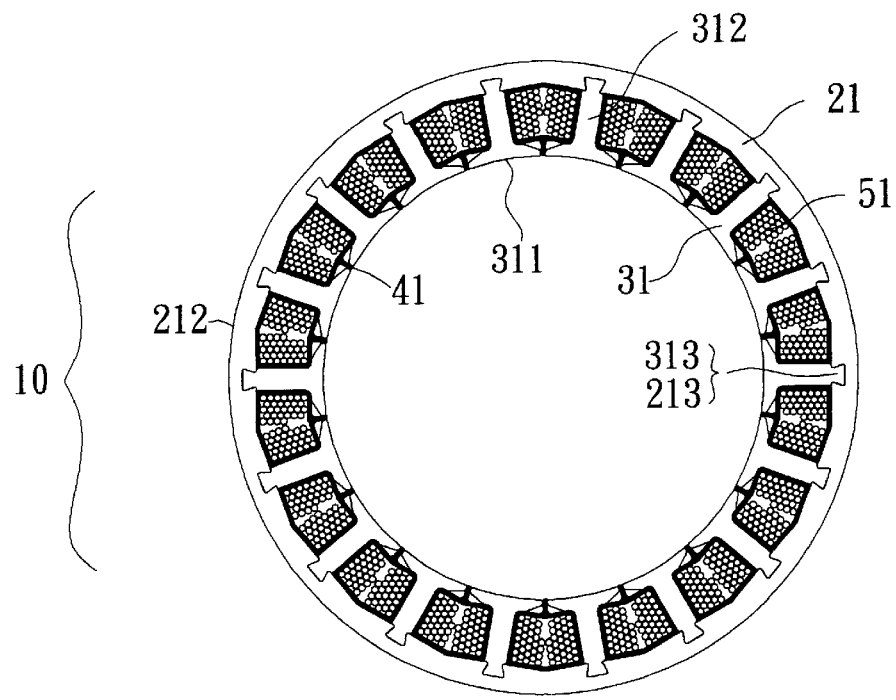
FIGS. 5 and 5A show the sectional views of the inner and outer stators of the first preferred embodiment of the present invention.
Figure 5A:
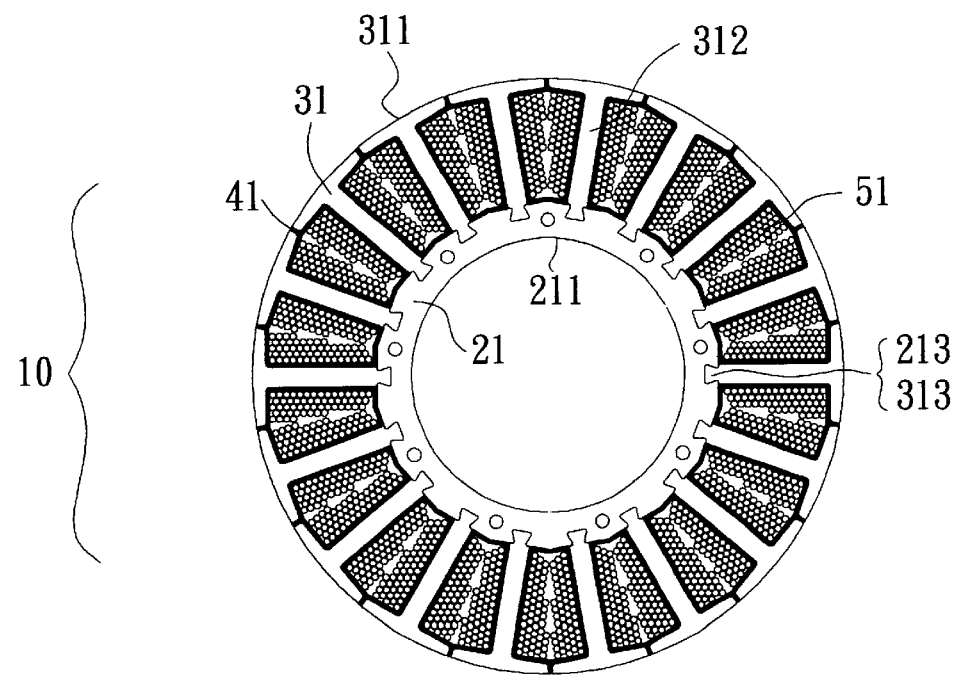
Figure 7:
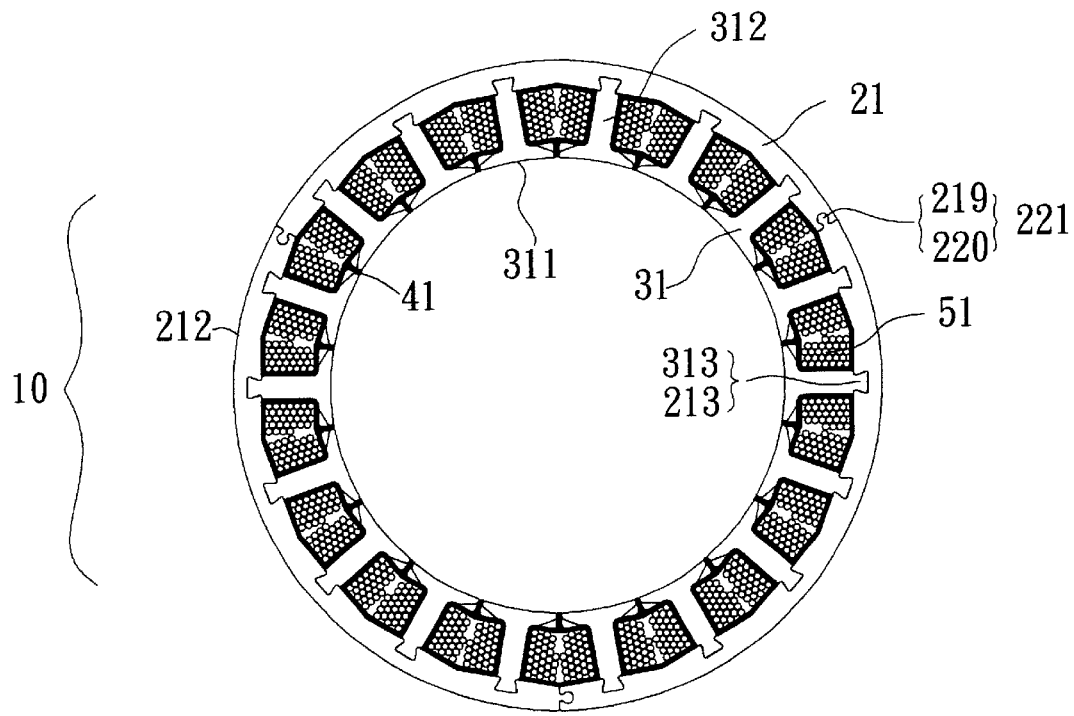
FIGS. 7 and 7A show the sectional views of the inner and outer stators of the second preferred embodiment of the present invention.
Figure 7A:
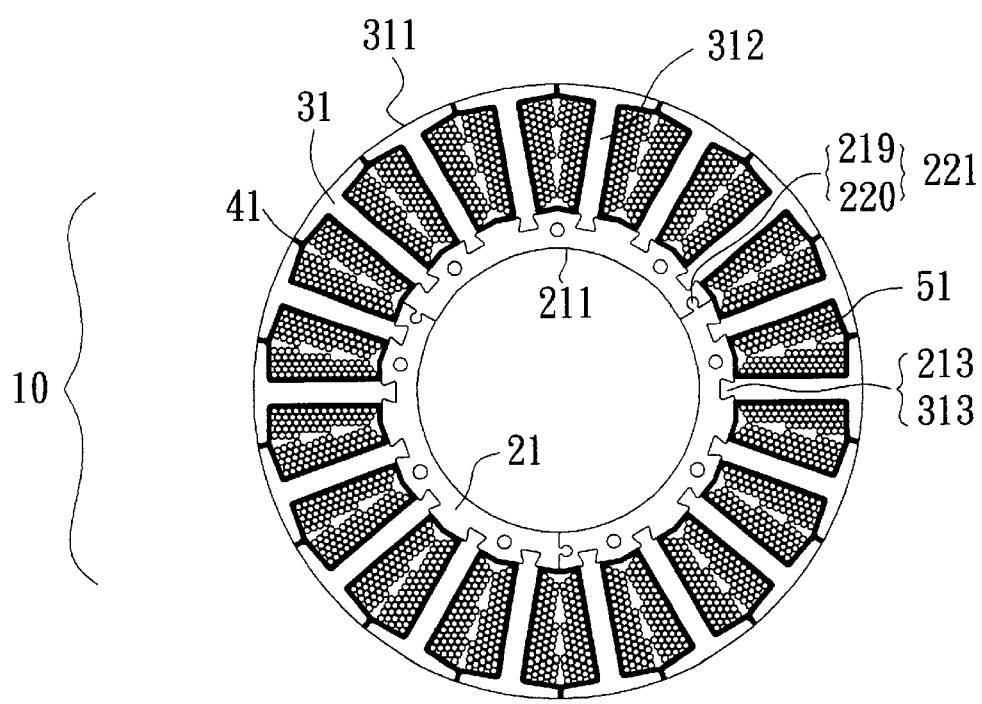
Figure 8:
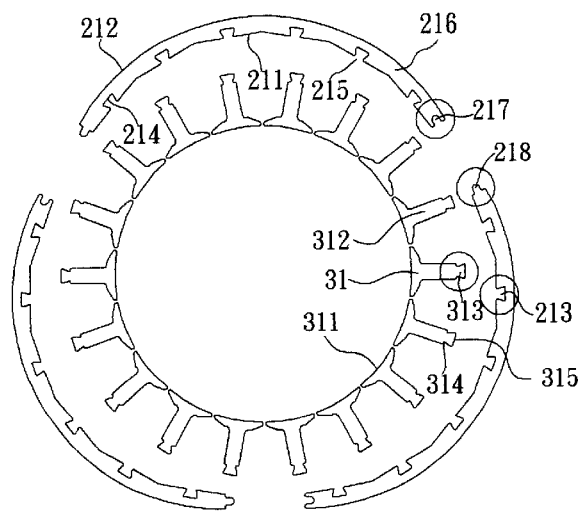
FIGS. 8 and 8A–8I show the views of the inner and outer stators and teeth of the third preferred embodiment of the present invention.
Figure 8A:
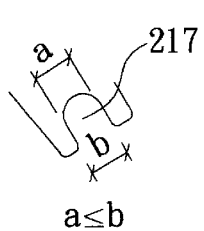
Figure 8B:
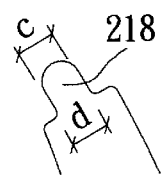
Figure 8C:
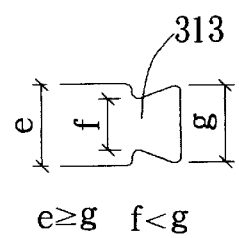
Figure 8D:
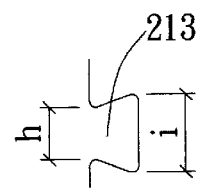
Figure 8E:
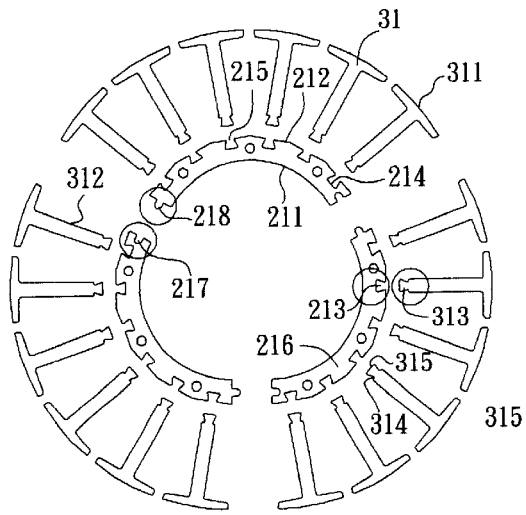
Figure 8F:
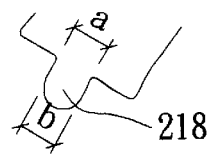
Figure 8G:
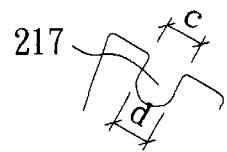
Figure 8H:
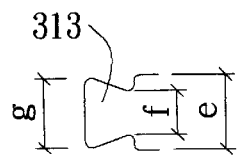
Figure 8I:
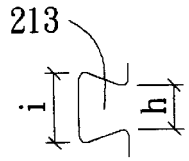
Figure 9:
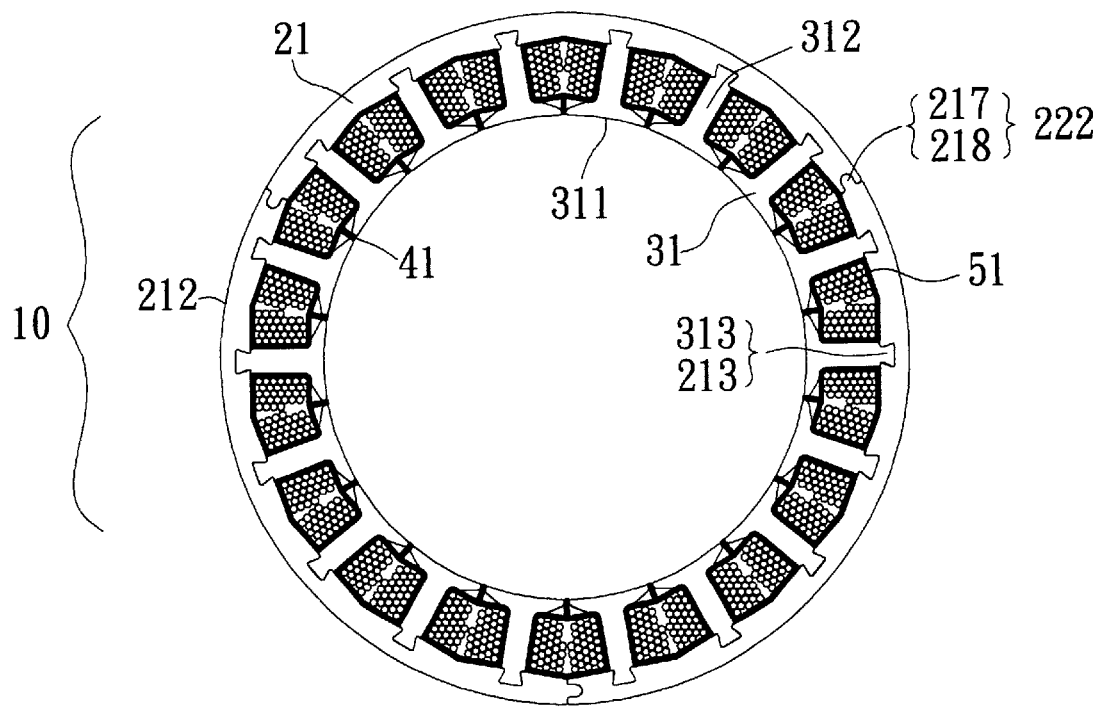
FIGS. 9 and 9A show the sectional views of the inner and outer stators of the third preferred embodiment of the present invention.
Figure 9A:
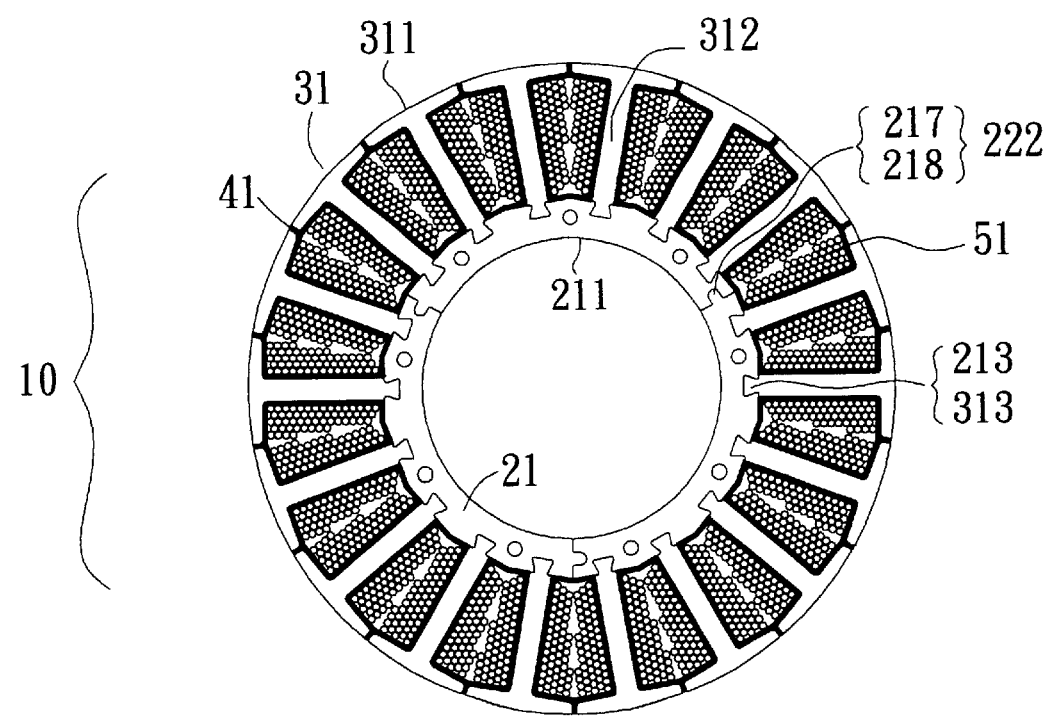
Figure 10:
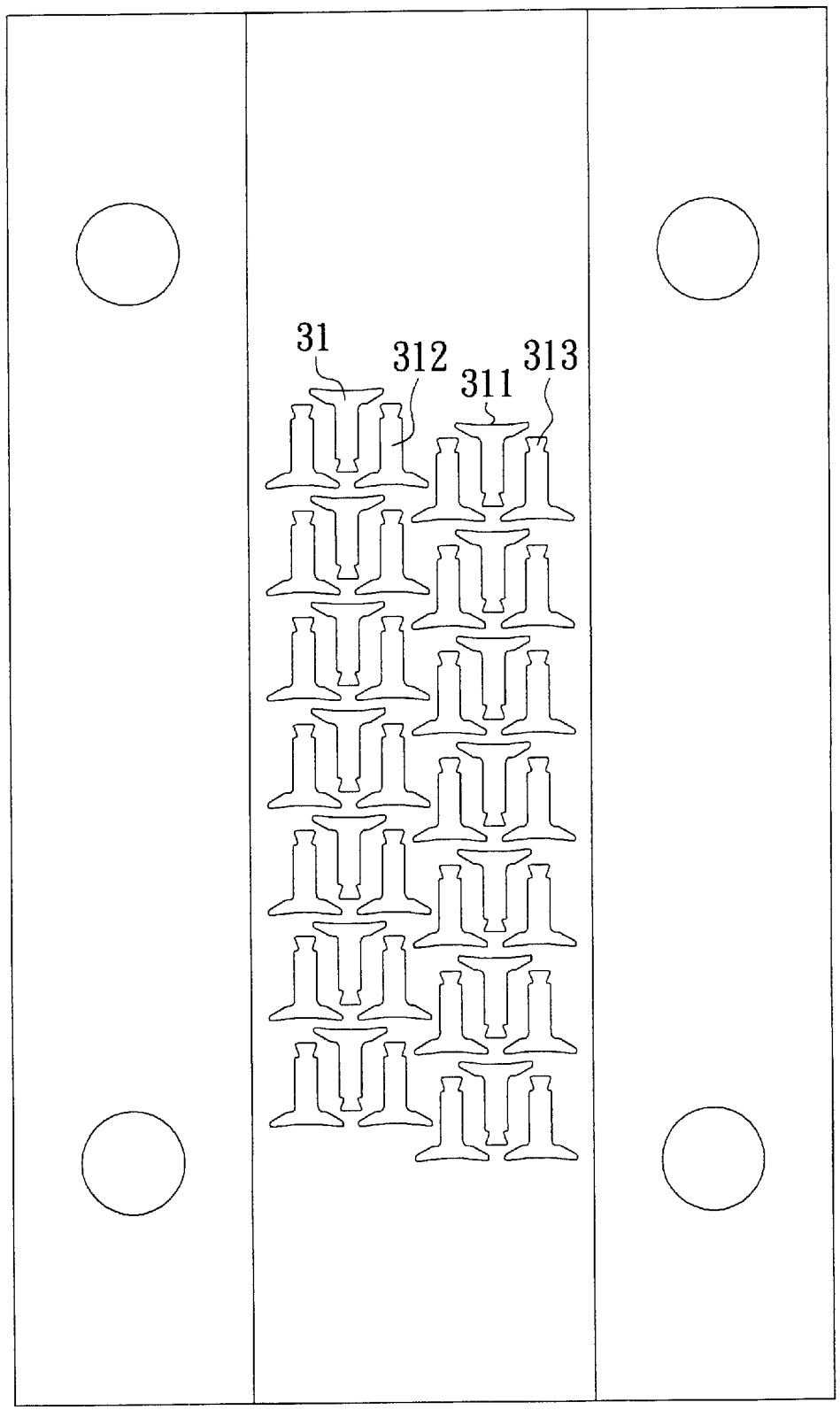
FIG. 10 shows the arrangement of stator teeth in the pressing mold.
Figure 11:
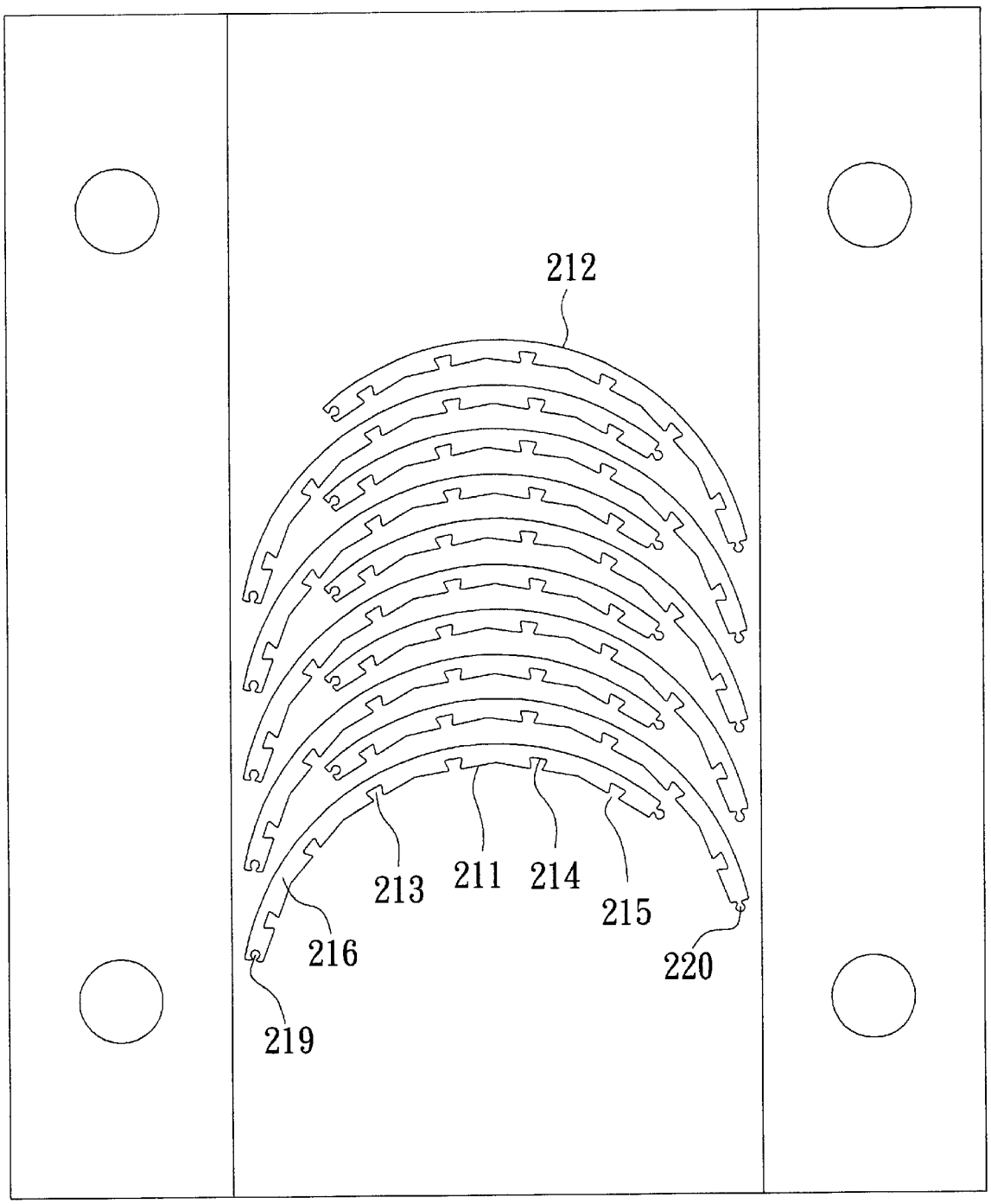
FIG. 11 shows the arrangement of the stator rings in the pressing mold.
Figure 12:
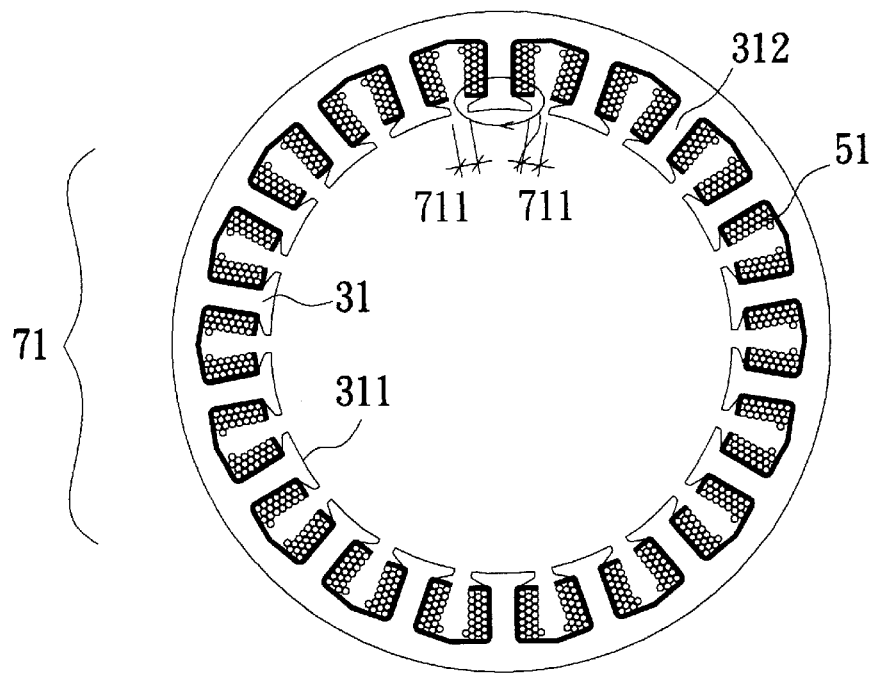
FIGS. 12 and 12A show the sectional views of the prior art inner and outer stators.
Figure 12A:
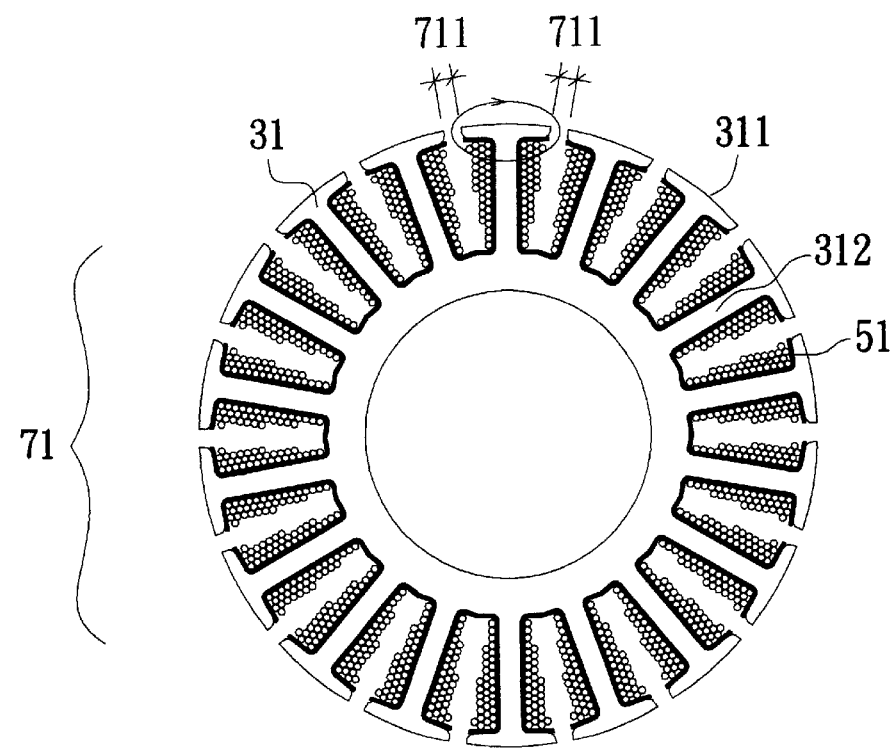

With reference now to FIGS. 1 to 11, the composite stator structure 10 according to the present invention comprises a stator ring 21 made of magnetic silicon steel and formed by pressing and stacking. One side of the stator ring 21 has a plurality of embedding grooves 213 with equal pitch and with number corresponding to the stator tooth number. The embedding groove 213 has a dent 214 wider than the mouth 215 of thereof. The stator ring 21 has a plurality of teeth 31 each having an arc-shaped tooth surface 311 and made of magnetic silicon steel by pressing and stacking. Each of the teeth 31 has a tooth flank 312 with a tooth tail 313. The inner end 314 of the tail 313 is thinner than the outer end 315 of the tooth tail 313 and has shape corresponding to that of the embedding groove 213 such that the tooth tail 313 can be firmly embedded into the embedding groove 213. The largest width of the outer end 315 of the tooth tail 313 cannot exceed the width of the tooth flank 312. The stator ring 21 has a plurality of insulating stages 41 with vertical post 411 on which the winding 51 is mounted or wrapped. The winding 51 is composed of conductive coil 511. The winding 51 has a head end 512 on one end thereof and a tail end 513 on another end thereof. The vertical post 411 has a hollow portion 413 corresponding to the tooth flank 312 of the tooth 31 and the tooth flank 312 of the tooth 31 passes through and mounted on the hollow portion 413.

A plurality of insulating plates 412 is provided between the stator ring 21 and the winding 51. The insulating plates 412 have guiding holes 416 on top and bottom sides thereof and used for mounting two needles 417 on top and bottom sides of each insulating plate 412.

In the present invention, the stator is referred to the inner stator of motor or a, electric generator; the stator ring 21 is referred to the inner ring of the stator. The outer ring 212 has a plurality of embedding grooves 213 concave to the inner ring 211 and arranged with a fixed pitch. The outer ring 212 can be of circular ring shape, non-circular ring shape, quadrilateral shape or polygonal shape. The inner ring 21 can be of ring shape or polygonal shape.

The stator ring 21 is divided into a plurality of equal units 216; each unit 216 has a concave end 219 on one end thereof and a convex end 220 on another end thereof. The concave end 219 has shape corresponding to that of the convex end 220 such that adjacent equal units 216 can be assembled through the embedding of the concave end 219 and the convex end 220. The width of the inner dent of the concave end 219 is larger than the mouth of the concave end 219 such that the assembled structure 221 assembled by one concave end 219 and one convex end 220 cannot be separated in lateral direction.

Alternatively, the stator ring 21 is divided into a plurality of equal units 216; each unit 216 has a concave end 217 on one end thereof and a convex end 218 on another end thereof. The concave end 217 has shape corresponding to that of the convex end 218 such that adjacent equal units 216 can be assembled through the embedding of the concave end 217 and the convex end 218. The width of the inner dent of the concave end 217 is smaller than or equal to the mouth of the concave end 217 such that the assembled structure 222 assembled by one concave end 217 and one convex end 218 cant be separated in lateral direction.

The insulating stage 41 is of T-shaped insulating stage 414. The winding 51 is firstly formed by winding and pressing-and-bending and then arranged on the vertical post 411.

Alternatively, the insulating stage 41 is of I-shaped insulating stage 415, and the winding 51 is wrapped on the vertical post 411 in straight-row or non straight-row fashion.

The winding 51 can be referred to the magnetic exciting winding of motor.

Alternatively, the winding 51 can be referred to the induced winding of generator.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A composite stator structure, comprising:
a stator ring made of stacked magnetic silicon steel members, the stator ring being formed by a plurality of units of equal size, each unit having a concave end on one end thereof and a convex end on another end thereof, the concave end having a complementary shape with respect to the convex end and a rear wall portion with a width dimension larger than a mouth portion of the concave end, wherein an assembled stator ring with respective concave ends engaged with respective convex ends cannot be separated in a lateral direction, each unit of the stator ring having a plurality of angularly spaced embedding grooves formed in one of an inner or outer side thereof, said plurality of embedding grooves having an equal pitch, each embedding groove having a mouth defining a predetermined opening dimension of the embedding groove and a rear wall portion having a predetermined width dimension, the predetermined width dimension of the rear wall portion being wider than the opening dimension of the embedding groove;
a plurality of stator teeth respectively engaged with said stator ring, each of the stator teeth being formed with an arc-shaped tooth surface on a distal end thereof, each of the stator teeth being made of magnetic silicon steel and formed by pressing and stacking, each of the stator teeth having a tooth flank extending from the distal end to a tooth tail at all opposing end of the tooth, the tooth tail having a complementary contour to a contour of a respective embedding groove with an inner end and an outer end, the inner end having a width dimension less than a width dimension of the outer end, the width dimension of the outer end of the tooth tail being smaller than a width dimension of the tooth flank;

a plurality of insulating stages respectively mounted on the stator teeth, each insulating stage having a hollow post on which a winding is mounted, the post being disposed on a respective tooth flank of a corresponding tooth.

2. A composite stator structure, comprising:

a stator ring made of stacked magnetic silicon steel members, the stator ring being formed by a plurality of units of equal size, each unit having a concave end on one end thereof and a convex end on another end thereof, the concave end having a rear wall portion with a width dimension less than or equal to a mouth portion of the concave end, wherein an assembled stator ring with respective concave ends engaged with respective convex ends can be separated in a lateral direction, each unit of the stator ring having a plurality of angularly spaced embedding grooves formed in one of an inner or outer side thereof, said plurality of embedding grooves having an equal pitch, each embedding groove having a mouth defining a predetermined opening dimension of the embedding groove and a rear wall portion having a predetermined width dimension, the predetermined width dimension of the rear wall portion being wider than the opening dimension of the embedding groove;

a plurality of stator teeth respectively engaged with said stator ring, each of the stator teeth being formed with an arc-shaped tooth surface on a distal end thereof, each of the stator teeth being made of magnetic silicon steel and formed by pressing and stacking, each of the stator teeth having a tooth flank extending from the distal end to a tooth tail at an opposing end of the tooth, the tooth tail having a complementary contour to a contour of a respective embedding groove with an inner end and an outer end, the inner end having a width dimension less than a width dimension of the outer end, the width dimension of the outer end of the tooth tail being smaller than a width dimension of the tooth flank;

a plurality of insulating stages respectively mounted on the stator teeth, each insulating stage having a hollow post on which a winding is mounted, the post being disposed of a respective tooth flank of a corresponding tooth.

3. The composite stator structure as in claim 1, wherein each insulating stage has a T-shape, and the winding is firstly formed to a solenoidal shape and then arranged on the post of the insulating stage.

4. The composite stator structure as in claim 1, wherein each insulating stage has an I-shape, and the winding is wrapped on the post of the insulating stage in straight-row or non straight-row fashion.

* * * * *